(12) United States Patent
Colas et al.

(10) Patent No.: US 11,064,834 B2
(45) Date of Patent: *Jul. 20, 2021

(54) PRESSURE COOKER HAVING BAYONET MOUNT AND RELATED MANUFACTURING METHOD

(71) Applicant: SEB S.A., Ecully (FR)

(72) Inventors: Thomas Antoine Colas, Dijon (FR); Eric Chameroy, Veronnes (FR); Hubert Chaillard, Longeau (FR)

(73) Assignee: SEB S.A., Ecully (FR)

( * ) Notice: Subject to any disclaimer, the term of this patent is extended or adjusted under 35 U.S.C. 154(b) by 852 days.

This patent is subject to a terminal disclaimer.

(21) Appl. No.: 15/129,104

(22) PCT Filed: Mar. 26, 2015

(86) PCT No.: PCT/FR2015/050786
§ 371 (c)(1),
(2) Date: Sep. 26, 2016

(87) PCT Pub. No.: WO2015/145086
PCT Pub. Date: Oct. 1, 2015

(65) Prior Publication Data
US 2017/0172335 A1    Jun. 22, 2017

(30) Foreign Application Priority Data
Mar. 26, 2014  (FR) ........................................ 1452581

(51) Int. Cl.
*A47J 27/08*   (2006.01)
(52) U.S. Cl.
CPC ....... *A47J 27/0806* (2013.01); *A47J 27/0815* (2013.01)

(58) Field of Classification Search
CPC .... A47J 27/0806; A47J 27/0815; A47J 27/08; A47J 27/0817; A47J 27/0804; A47J 27/0808; A47J 27/0813; A47J 27/09
(Continued)

(56) References Cited

U.S. PATENT DOCUMENTS 2,583,085 A  *  1/1952  Campbell ........... B29C 35/0227
                                                        425/34.2
2,600,703 A  *  6/1952  Strom ................. A47J 27/0806
                                                          220/298

(Continued)

FOREIGN PATENT DOCUMENTS

BR           8601076 A      10/1987
CH            571335 A5      1/1976

(Continued)

OTHER PUBLICATIONS

Translation of EP2926697A1, Colas et al., Appliance for Cooking Food Under Pressure with Inveted Bayonetsand Related Manufacturing Method. Jul. 10, 2015. (Year: 2015).*

(Continued)

*Primary Examiner* — Steven A. Reynolds
*Assistant Examiner* — Javier A Pagan
(74) *Attorney, Agent, or Firm* — Loeb & Loeb LLP

(57) ABSTRACT

The invention relates to a food pressure cooking appliance including a bowl and a lid intended to be locked relative to the bowl to form with the latter a cooking chamber adapted to rise in pressure. The appliance includes bayonet locking means forming first and second series of protrusions that are integral with the envelope of the lid and the envelope of the bowl, respectively, and that are intended to cooperate with each other to ensure the locking of the lid relative to the bowl. Each protrusion of at least one of the series consists of a volume element that has opposite convex and concave (Continued)

faces and is formed by a localized radial deformation of the corresponding envelope.

29 Claims, 6 Drawing Sheets

(58) Field of Classification Search
USPC ....... 99/337; 220/202, 203.1, 912, 316, 315; 219/440, 431
See application file for complete search history.

(56) References Cited

U.S. PATENT DOCUMENTS

| | | | | | |
|---|---|---|---|---|---|
| 2,660,330 | A | * | 11/1953 | Keller | A47J 27/0806 220/298 |
| 3,653,533 | A | * | 4/1972 | Mortensen | F16J 13/12 220/298 |
| 3,655,090 | A | * | 4/1972 | Rothrock | F16J 13/12 220/298 |
| 3,876,385 | A | * | 4/1975 | Markus | B01J 3/03 422/118 |
| 4,276,990 | A | * | 7/1981 | Chiodo | B65D 51/1666 220/203.12 |
| 5,768,976 | A | * | 6/1998 | Suk | A47J 27/0806 99/337 |
| 6,425,320 | B1 | * | 7/2002 | Chameroy | A47J 27/0806 99/337 |
| 6,695,319 | B1 | * | 2/2004 | Anota | A47J 27/09 220/203.11 |
| 8,096,436 | B2 | * | 1/2012 | Rhetat | A47J 27/09 220/203.01 |
| 9,320,381 | B2 | * | 4/2016 | Chameroy | B65D 53/00 |
| 10,542,836 | B2 | * | 1/2020 | Chameroy | A47J 27/0806 |
| 2003/0024936 | A1 | * | 2/2003 | Niese | A47J 27/08 220/573.1 |
| 2008/0196599 | A1 | * | 8/2008 | Bhagat | A47J 27/21191 99/444 |
| 2009/0101643 | A1 | * | 4/2009 | Rhetat | A47J 27/09 220/203.01 |
| 2013/0068113 | A1 | * | 3/2013 | Chameroy | A47J 27/0806 99/352 |
| 2013/0119056 | A1 | * | 5/2013 | Jacobson | A47J 43/27 220/4.01 |
| 2014/0339223 | A1 | * | 11/2014 | Backaert | A47J 36/027 219/732 |
| 2014/0360384 | A1 | * | 12/2014 | Kim | A47J 27/0806 99/403 |

FOREIGN PATENT DOCUMENTS

| | | | |
|---|---|---|---|
| CH | 694356 | A5 | 12/2004 |
| CN | 2389593 | Y | 8/2000 |
| CN | 2469839 | Y | 1/2002 |
| CN | 201624512 | U | 11/2010 |
| CN | 102349791 | A | 2/2012 |
| CN | 102166092 | B | 5/2013 |
| CN | 203000535 | U | 6/2013 |
| DE | 3703448 | A1 * | 8/1988 ........ A47J 27/0806 |
| DE | 3703448 | A1 | 8/1988 |
| DE | 29508504 | U1 | 9/1995 |
| EP | 0743036 | A1 | 11/1996 |
| EP | 2258243 | A1 | 12/2010 |
| EP | 2732736 | A1 | 5/2014 |
| EP | 2926697 | A1 * | 3/2015 ........... A47J 27/08 |
| FR | 2782257 | A1 | 2/2000 |
| FR | 2783687 | A1 | 3/2000 |
| GB | 641540 | A | 8/1950 |
| GB | 657982 | A | 10/1951 |
| JP | S598018 | U | 7/1983 |
| WO | 0143605 | A1 | 6/2001 |
| WO | 2013039332 | A2 | 3/2013 |

OTHER PUBLICATIONS

International Searching Authority, International Search Report, International Application No. PCT/FR2015/050786, dated Jul. 10, 2015, 7 pages.
International Searching Authority, Written Opinion, International Application No. PCT/FR2015/050786, dated Oct. 1, 2015, 5 pages.
Search Report and Written Opinion issued by Institut National de la Propriété Industrielle, French Patent Application No. 1552579, dated Feb. 2, 2016, 8 pages.
Search Report and Written Opinion issued by Institut National de la Propriété Industrielle, French Patent Application No. 1554997, dated Mar. 31, 2016, 6 pages.
Search Report and Written Opinion issued by Institut National de la Propriété Industrielle, French Patent Application No. 1554999, dated Mar. 22, 2016, 6 pages.
Search Report and Written Opinion issued by Institut National de la Propriété Industrielle, French Patent Application No. 1555000, dated Mar. 22, 2016, 6 pages.
Search Report and Written Opinion issued by Institut National de la Propriété Industrielle, French Patent Application No. 1555001, dated Mar. 22, 2016, 6 pages.
Office Action dated May 7, 2018 for U.S. Appl. No. 15/172,048 (pp. 1-7).
Notice of Allowance dated May 23, 2018 for U.S. Appl. No. 15/172,054 (pp. 1-5).
International Searching Authority, Written Opinion, in International Application No. PCT/FR2015/050786, dated Oct. 1, 2015, 10 pages.
Search Report issued by Institut National de la Propriete Industrielle, for French Patent Application No. 1653140, dated Nov. 23, 2016, 2 pages.
Office Action dated Aug. 13, 2018 for U.S. Appl. No. 15/081,303 (pp. 1-9).
Office Action dated May 15, 2020 for U.S. Appl. No. 15/479,822 (pp. 1-15).
Semiatin, S.L.. ASM Handbook, vol. 14B—Metalworking: Sheet Forming—Table of Contents. ASM International, 2006 (Year: 2006) (9 pages).

* cited by examiner

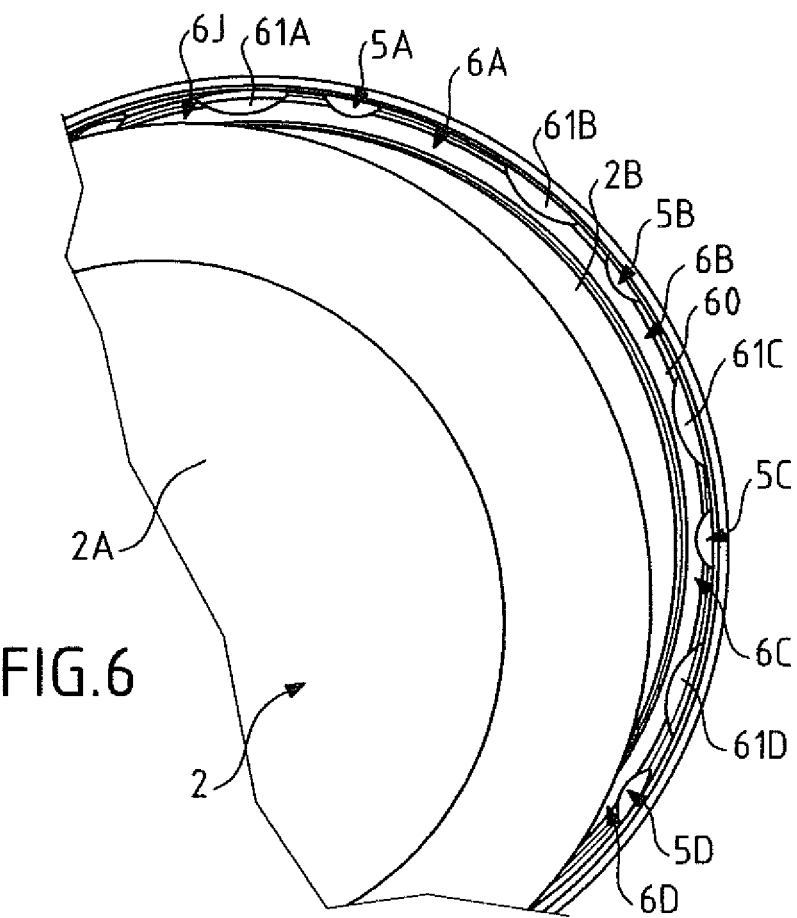
FIG.6
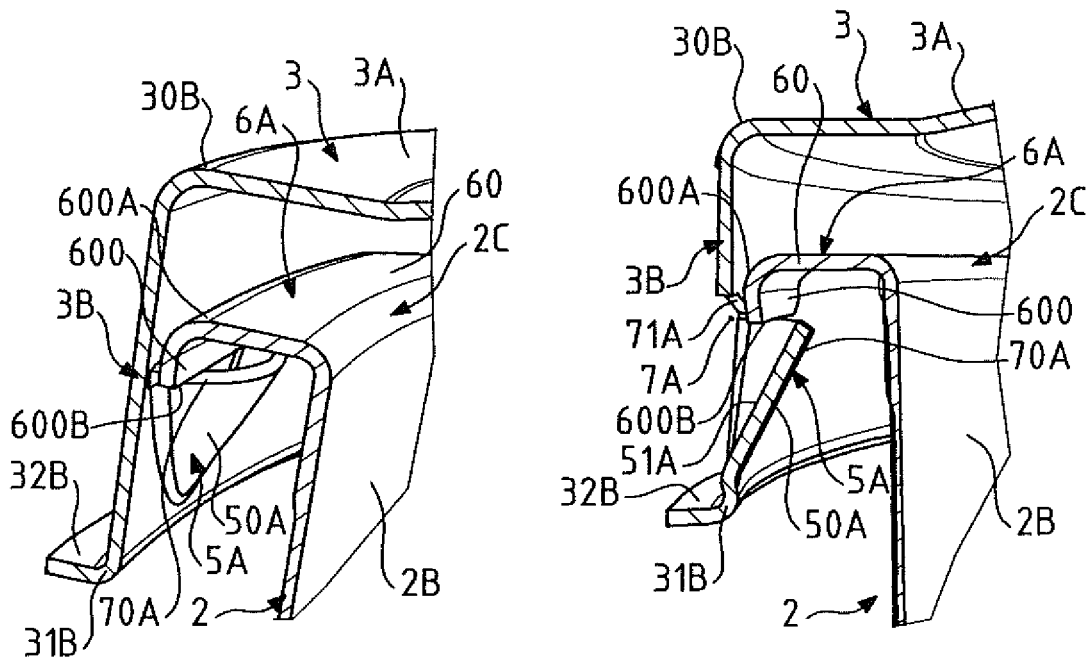
FIG.7
FIG.8

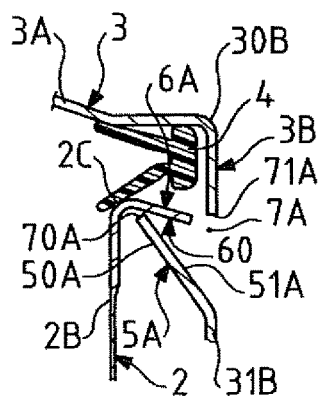
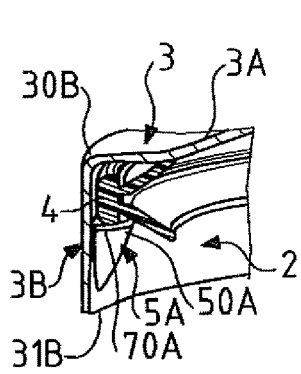
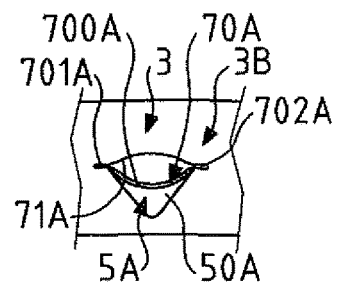
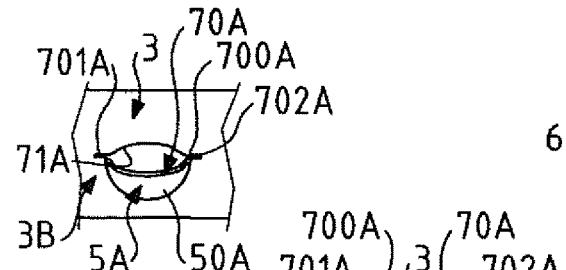
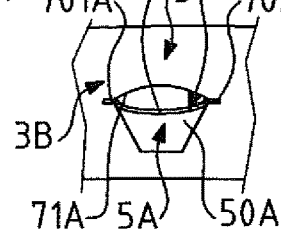
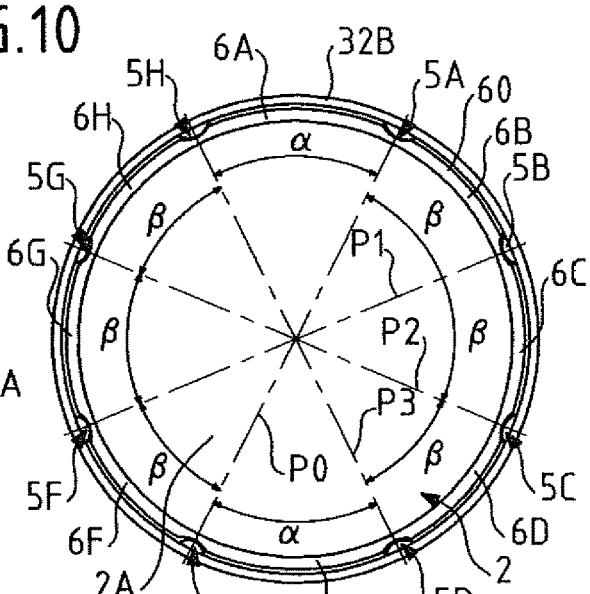
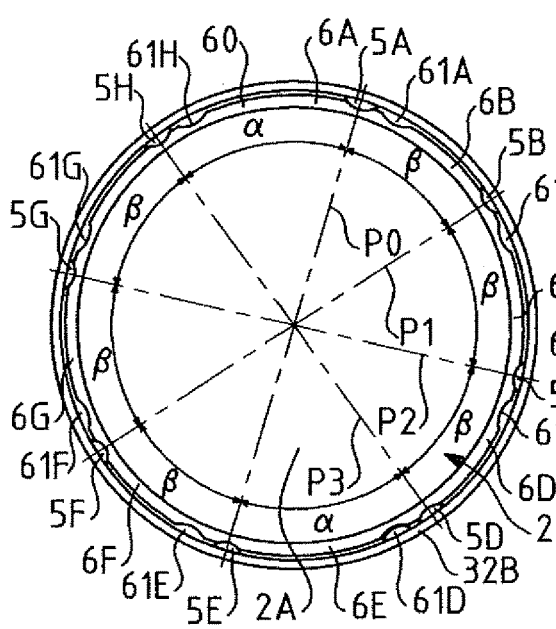
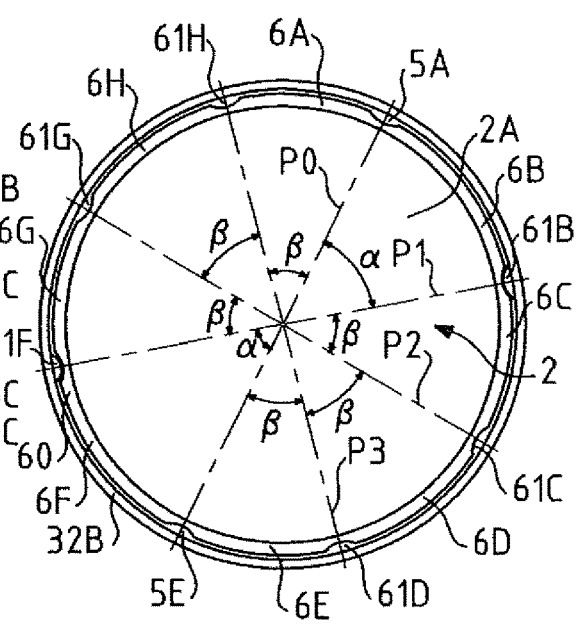

PRESSURE COOKER HAVING BAYONET MOUNT AND RELATED MANUFACTURING METHOD

CROSS-REFERENCES TO RELATED APPLICATIONS

This application is a U.S. national stage filing of International PCT Application No. PCT/FR2015/050786, filed Mar. 26, 2015, entitled "Pressure Cooker Having Bayonet Mount And Related Manufacturing Method," which claims priority to, and the benefit of, French Patent Application No. FR-14 52581, filed Mar. 26, 2014, entitled "Pressure Cooker Having Bayonet Mount And Related Manufacturing Method," the entire contents of which are incorporated herein by reference.

TECHNICAL AREA

The present invention relates to the general technical field of food pressure cooking appliances, and in particular the household appliances of the pressure cooker type intended to form a cooking chamber able to rise in pressure in order to ensure the steam-pressure cooking of food contained therein.

The present invention more particularly relates to a food pressure cooking appliance including at least a bowl and a lid intended to be locked relative to the bowl to form with the latter a cooking chamber adapted to rise in pressure, as well as bayonet locking means forming first and second series of protrusions that are integral with the envelope of the lid and the envelope of the bowl, respectively, and that are intended to cooperate with each other to ensure the locking of the lid.

The present invention also relates to a method of manufacturing a food pressure cooking appliance including at least a bowl and a lid intended to be locked relative to the bowl to form with the latter a cooking chamber adapted to rise in pressure, as well as bayonet locking means forming first and second series of protrusions that are integral with the envelope of the lid and the envelope of the bowl, respectively, and that are intended to cooperate with each other to ensure the locking of the lid.

BACKGROUND

The food pressure cooking appliances, in particular for household use, are well known.

They generally comprise a metal bowl on which is intended to be sealingly added, through a flexible annular sealing gasket, an also metallic lid, in order to form a cooking chamber able to rise in pressure.

The lid is intended to be linked to the bowl through locking means allowing the pressure cooker to switch between a locking configuration for locking the lid relative to the bowl, in which the cooking chamber is able to rise in pressure, and an unlocking configuration in which the lid may be freely separated from the bowl.

Different well-known types of locking means exist in the prior art. One of the most widespread systems is the bayonet locking system, which is based on the implementation of bowl and lid ramps intended to come in mutual sliding bearing after rotation of the lid to hence ensure a mechanical holding link preventing the separation of the bowl and the lid under the effect of the rising in pressure. The lid ramps are conventionally made by localized folding inward of the annular falling edge of the lid, whereas the bowl ramps are obtained by folding and cutting of the free upper edge of the bowl. Such a bayonet locking system wholly gives satisfaction, but has nevertheless certain drawbacks.

In particular, due to their design itself, the bowl and lid ramps have a resistance to deformation, and in particular to bending, which is far from being optimum. This imposes using ramps of great thickness that extend along the perimeter of the bowl (respectively, along the perimeter of the lid) over relatively high lengths, so as to ensure a link of the bowl and lid ramps liable to satisfy the particularly demanding standards and specifications as regards the household appliances. Certain standards provide in particular that a bayonet pressure-cooker locking mechanism must resist to a test pressure of 500 kPa with no separation of the bowl and the lid. The conventional bayonet locking systems implemented in the known pressure cookers are hence based on the use of lid and bowl ramps of great lengths, which provides the pressure cooker with a not very valuable aesthetical character, due in particular to the relatively unstructured aspect of the bowl edge, in which are formed notches (allowing the engagement of the lid ramps) that extend over at least half the perimeter of the bowl edge.

The bayonet locking systems implemented in the known pressure cookers hence necessarily induce very specific conformations and sizes of the bowl and lid edges, which limit in particular the possibility of accessorization of the concerned pressure cookers, and affect significantly the general aspect thereof.

Moreover, due to the relatively great length of the bowl and lid ramps, it is necessary to make the lid rotate with respect to the bowl according to a relatively great angular stroke to make all the lid ramps entirely coincide with all the corresponding bowl ramps and to hence obtain an efficient and safe locking. The great angular stroke may further be difficult to follow due to the frictions between the bowl and lid ramps (as well as the sealing gasket) that it implies.

Finally, the known bayonet pressure-cooker locking systems are absolutely not optimized as regards in particular their mechanical behaviour (mechanical resistance and resistance to deformation), their weight, their aesthetics, their ergonomics, and their easiness of use. As regards specifically this latter point (easiness of use), it proves that the capacity of the known bayonet locking mechanisms to suggest naturally and intuitively their own use (capacity generally called "affordance") is far from being optimum.

SUMMARY

The invention hence proposes to remedy the different drawbacks exposed hereinabove and to propose a new pressure cooking appliance whose locking means is particularly efficient, in particular from the resistance to deformation point of view, while being light in weight, safe, easy to handle and having good properties of affordance as well as an improved aesthetics.

Another object of the invention aims to propose a new pressure cooking appliance provided with locking means that may be manufactured in a simple manner and at a lesser cost, while being particularly robust and reliable.

Another object of the invention aims to propose a new pressure cooking appliance that provides a high level of security of use.

Another object of the invention aims to propose a new pressure cooking appliance whose locking means may be manufactured by means of an industrial tool whose operation is based on well-known and tested principles.

Another object of the invention aims to propose a new pressure cooking appliance whose design facilitates the suitable positioning of the lid relative to the bowl.

Another object of the invention aims to propose a new pressure cooking appliance whose design allows the user to easily and intuitively make sure of the correct locking of the lid relative to the bowl.

Another object of the invention aims to propose a new method of manufacturing a pressure cooking appliance that is based on particular simple and economic steps, while making it possible to obtain a cooking appliance provided with extremely efficient and safe locking means.

Another object of the invention aims to propose a new method of manufacturing a pressure cooking appliance that may be implemented by means of simple and economic industrial tools.

The objects of the invention are achieved by means of a food pressure cooking appliance including at least:
- a bowl and a lid intended to be locked relative to the bowl to form with the latter a cooking chamber adapted to rise in pressure,
- bayonet locking means forming first and second series of protrusions that are integral with the envelope of the lid and the envelope of the bowl, respectively, and that are intended to cooperate with each other to ensure the locking of the lid relative to the bowl, said appliance being characterized in that each protrusion of at least one of said series is consisted by a volume element that has opposite convex and concave faces, and that is formed by a localized radial deformation of the corresponding envelope.

The objects intended to the invention are also achieved by means of a method of manufacturing a food pressure cooking appliance including at least:
- a bowl and a lid intended to be locked relative to the bowl to form with the latter a cooking chamber adapted to rise in pressure,
- bayonet locking means forming first and second series of protrusions that are integral with the envelope of the lid and the envelope of the bowl, respectively, and that are intended to cooperate with each other to ensure the locking of the lid relative to the bowl, said method being characterized in that each protrusion of at least one of said series is consisted by a volume element that has opposite convex and concave faces, said method including a step of forming said volume element by a localized radial deformation of the corresponding envelope.

BRIEF DESCRIPTION OF THE DRAWINGS

Other features and advantages of the invention will appear and be revealed in more detail in the following description, made with reference to the appended drawings and given by way of purely illustrative and non-limitative examples, in which:

FIG. 6 illustrates, according to an incomplete schematic perspective view partially from below, the appliance of FIG. 6 with the lid added and locked to the bowl.

FIGS. 7 and 8 are schematic sectional views, according to two respective section planes, of a detail of embodiment of the pressure cooker of FIG. 6.

FIG. 9 illustrates, according to a schematic sectional view, the way the sealing gasket is positioned within a pressure cooker according to the invention whose lid is locked to the bowl.

FIG. 10 is a partial sectional view illustrating too the positioning of the sealing gasket in the non-locked lid of a pressure cooker according to the invention.

FIG. 11 illustrates, in a schematic front view, an example of lid ramp conformation, corresponding to the conformation implemented in the pressure cooker of FIGS. 1 to 10.

FIGS. 12 and 13 illustrate, in a schematic front view, alternative lid ramps conformations liable to be implemented instead of, or in association with, the ramps of FIG. 11.

FIG. 14 illustrates, in a schematic bottom view, an appliance similar to that of the preceding figures (except in that the locking means thereof include eight lid and bowl protrusions and not ten as in the variants of the preceding figures), in the unlocking configuration.

FIG. 15 illustrates, in a bottom view, the appliance of FIG. 14 in the locking configuration.

FIG. 16 illustrates, in a bottom view, the pressure cooker of FIGS. 14 and 15 with the lid added to the bowl in an incorrect configuration that does not allow the locking.

DETAILED DESCRIPTION

Figure 1:
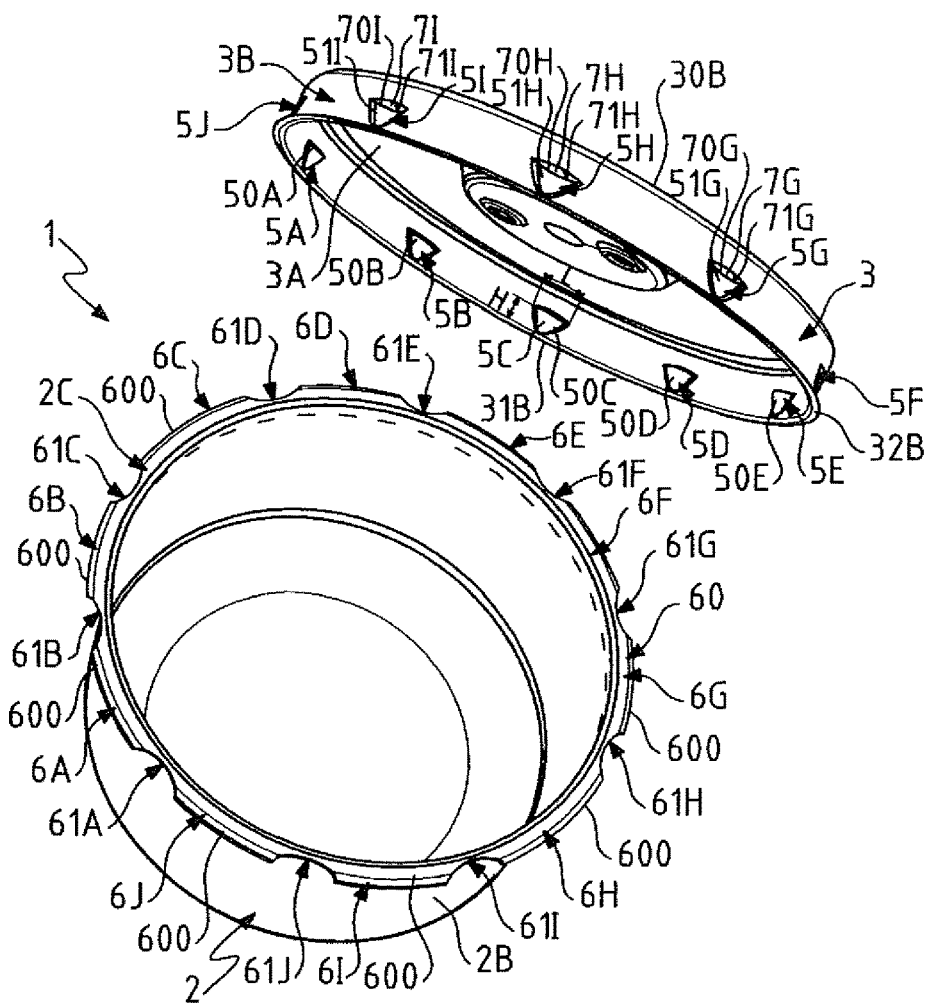
FIG. 1 illustrates, according to a schematic perspective view, a first embodiment of a food pressure cooking appliance according to the invention, with the lid separated from the bowl.

As illustrated in the Figures, the invention relates to a food pressure cooking appliance 1, intended to ensure the cooking of various foodstuffs at a level of pressure higher than the atmospheric pressure, in the presence of steam, and for example water steam. Said steam is generated by the heating, with the appliance 1 and in the presence of food, of a cooking liquid, for example an aqueous liquid. The appliance 1 according to the invention is preferentially intended to a household use, it being however understood that the invention may also relates to professional or semi-professional appliances.

The appliance 1 according to the invention is designed to rise in pressure exclusively under the effect of a heating source (integrated or external), without addition of external pressure. The food pressure cooking appliance 1 hence constitutes a pressure cooker, preferentially intended to be placed on an independent cooking plate to heat the content thereof.

The cooking appliance 1 according to the invention includes at least a bowl 2 forming a cooking vessel, intended to receive the food to be cooked and having herein substantially a symmetry of revolution about a central axis X-X', which extends along a direction that is liken to the vertical direction when the appliance 1 is in normal operation, i.e. is placed on a horizontal plane. The bowl 2 is conventionally manufactured from a metal material such as stainless steel or aluminium, or any other suitable material, coated (for example, with a layer of ceramic, PTFE, enamel, lacquer . . . ) or not. The bowl 2 comprises a bottom 2A, which is for example a multi-layer heat-conductor bottom fastened to the remaining of the bowl 2 by any suitable technique (for example, heat embossing). The bowl 2 also comprises an annular lateral wall 2B that rises between said bottom 2A and a free upper edge 2C, which is herein of circular shape, and which delimits an opening of access inside the bowl 2. The conformation of this free upper edge 2C will be described in more detail hereinafter, in relation with the locking means of the appliance 1. The bowl 2 may also include gripping members, such as bowl handles 2D, 2E (cf. FIGS. 17 to 19), preferentially two in number, and fixed for example to the lateral wall 2B of the bowl 2 in a diametrically opposed way with respect to the central axis X-X'.

The appliance 1 according to the invention also comprises a lid 3 intended to be associated with the bowl 2, to form with the latter a cooking chamber. More precisely, the lid 3 is intended to be locked relative to the bowl 2 to form with the latter a cooking chamber adapted to rise in pressure, i.e. a cooking chamber tight enough to allow the rising in pressure of the appliance 1.

In order to obtain this sealed, tight character, the appliance 1 advantageously includes a sealing gasket, such as a flexible annular gasket 4, made of elastomer for example, intended to be interposed between the lid 3 and the bowl 2, to hence prevent any uncontrolled leakage of steam and/or air between the inside of the chamber and the outside.

The lid 3 is conventionally manufactured from a metal material such as stainless steel or aluminium, or any other suitable material, coated (for example, with a layer of ceramic, PTFE, enamel, lacquer . . . ) or not. It advantageously has a shape conjugated to that of the bowl 2, for example a generally discoid shape, which advantageously extends in a mean plane substantially parallel to the mean plane of extension of the bottom 2A of the bowl 2 (i.e., herein, a substantially horizontal plane) when it is added and locked to the latter. In the embodiments illustrated in the Figures, the envelope of the lid 3 includes a discoid covering element 3A of shape and size conjugated to those of the access opening delimited by the free upper edge 2C of the annular lateral wall 2B of the bowl 2. In the embodiments illustrated in the Figures, the envelope of the lid 3 also includes an annular belt 3B, for example of substantially cylindrical or truncated shape, which rises between a first circular edge 30b integral with the discoid covering element 3A (herein at the periphery of the latter) and a second free circular edge 31B, which is for example itself extended by a flange 32B (absent in the variants illustrated in FIGS. 9, 10 and 17 to 19). As illustrated in the Figures, the discoid covering element 3A wholly extends along a horizontal mean plane, i.e. herein parallel to the mean plane of extension of the bottom 2A of the bowl 2 when the lid 3 is associated with the bowl 2 to form the cooking chamber, whereas the annular belt 3B extends substantially vertically, i.e. parallel to the central axis X-X', the terminal flange 32B extending itself substantially horizontally. This of course does not exclude that the discoid covering element 3A can be, as illustrated in the Figures, locally slightly rounded or curved, as well known as such.

Figure 20:
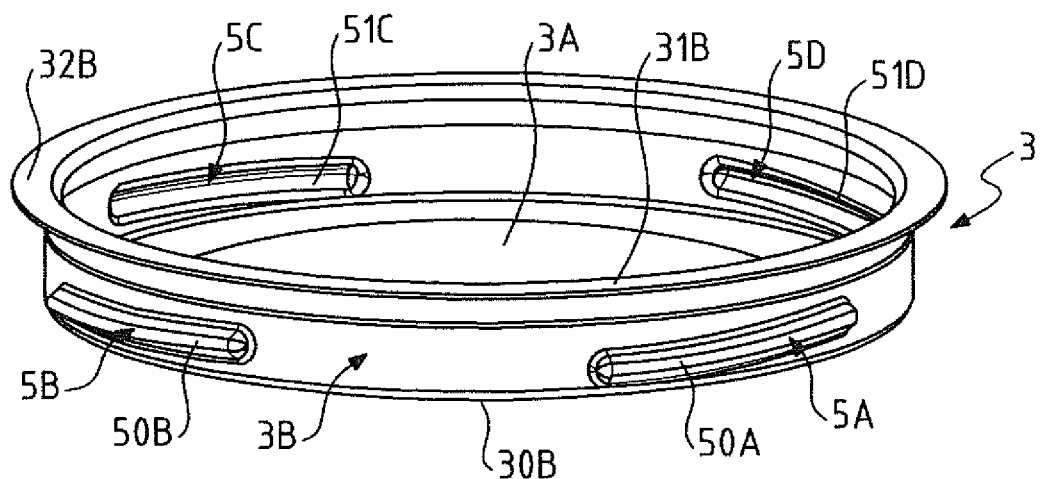
FIGS. 20 and 21 illustrate, respectively, in schematic perspective views, the lid and the bowl of a pressure cooker according to a third embodiment of the invention.
Figure 21:
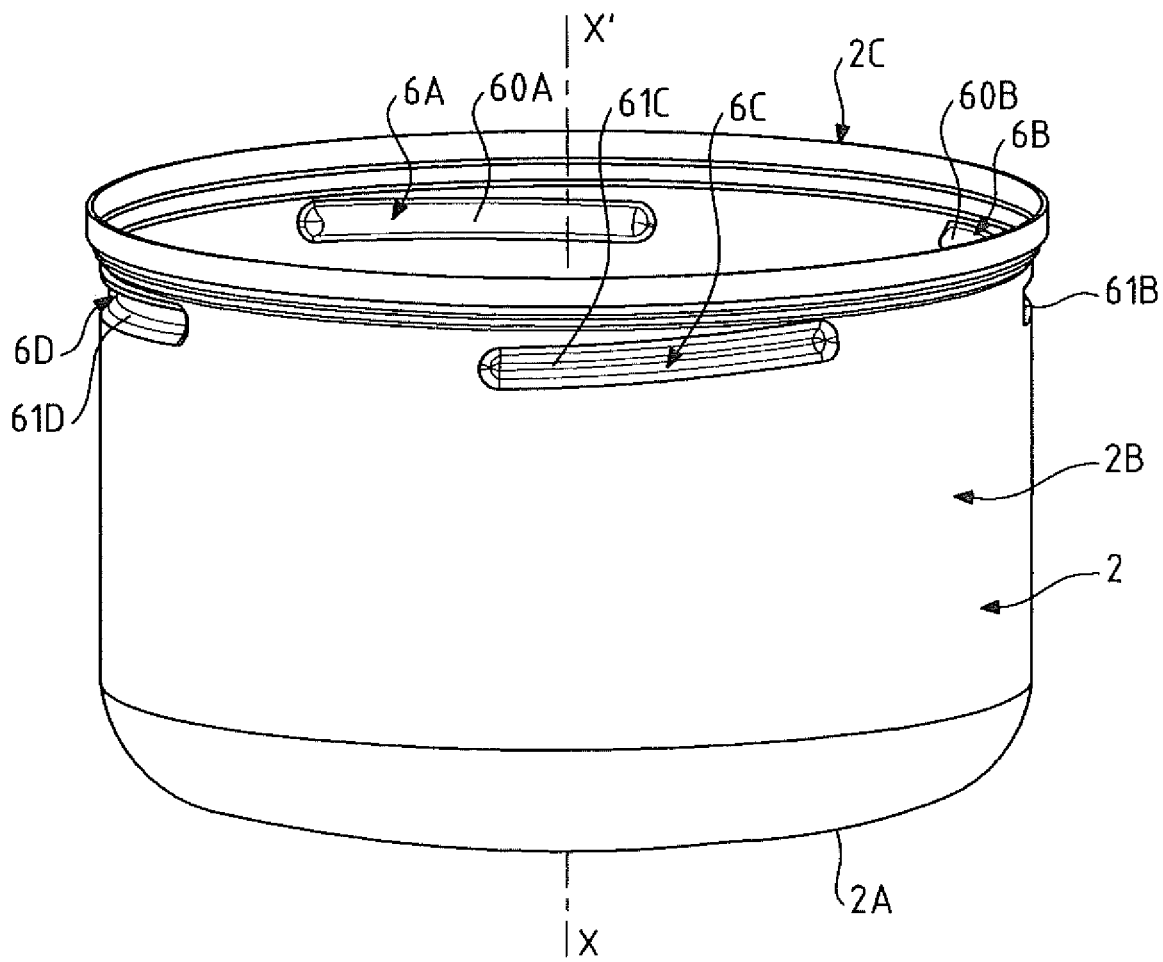

In the embodiments of FIGS. 1 to 19, the annular belt 3B is formed by a falling edge that extends downward from the periphery of the discoid covering element 3A. In these embodiments, the lid 3 is intended to cover in a substantially adjusted manner the top of the bowl 2, so that the annular belt 3B surrounds from the outside the top of the annular lateral wall 2B and the free upper edge 2C. In the embodiment of FIGS. 20 and 21, the annular belt 3B is the time intended to be inserted within the bowl 2, so as to be surrounded by, and contained in, the bowl 2. In this case, the terminal flange 32B of the lid 3 is then intended to bear on and against the free upper edge 2C of the annular lateral wall 2B of the bowl 2.

The food pressure cooking appliance 1 according to the invention advantageously comprises a pressure regulation means (not illustrated), as for example a valve, preferably mounted on the lid 3 and arranged so as to maintain the pressure inside the cooking chamber at predetermined value substantially constant, called operating pressure, which exceeds the atmospheric pressure by a value that is comprised for example between substantially 10 and 120 kPa, and which is preferably of the order of 100 kPa. The general principle of operation of such a pressure regulation means is well known as such, so that it is not necessary to describe it in more detail herein.

Figure 2:
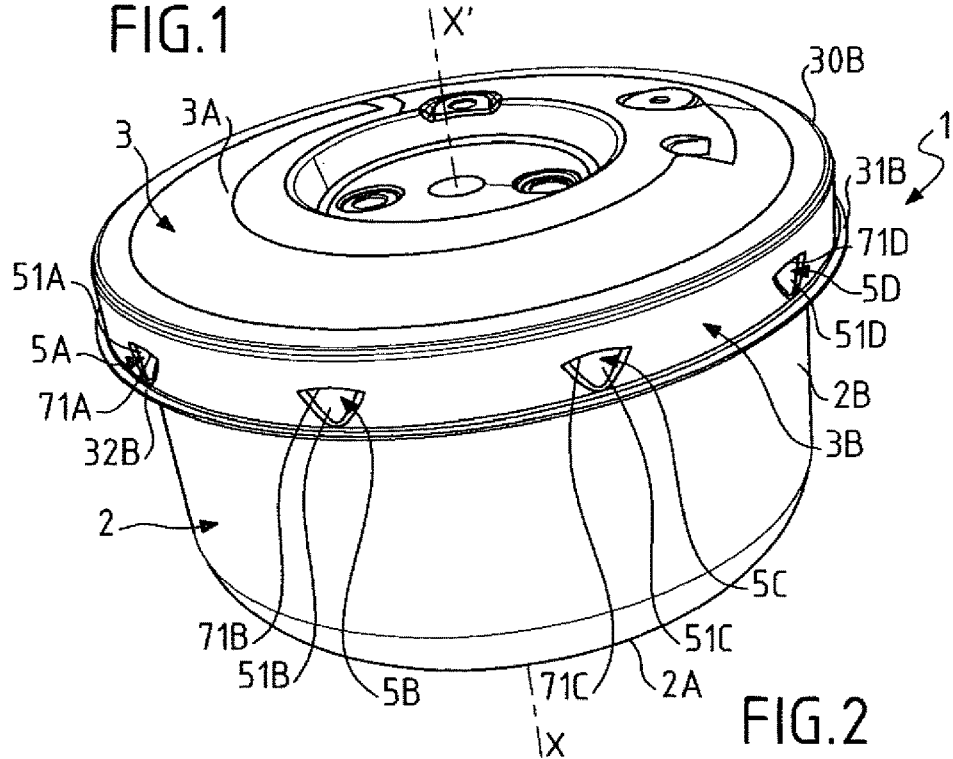
FIG. 2 illustrates, according to a schematic perspective view, the appliance of FIG. 1 with the lid added and locked to the bowl.
Figure 3:
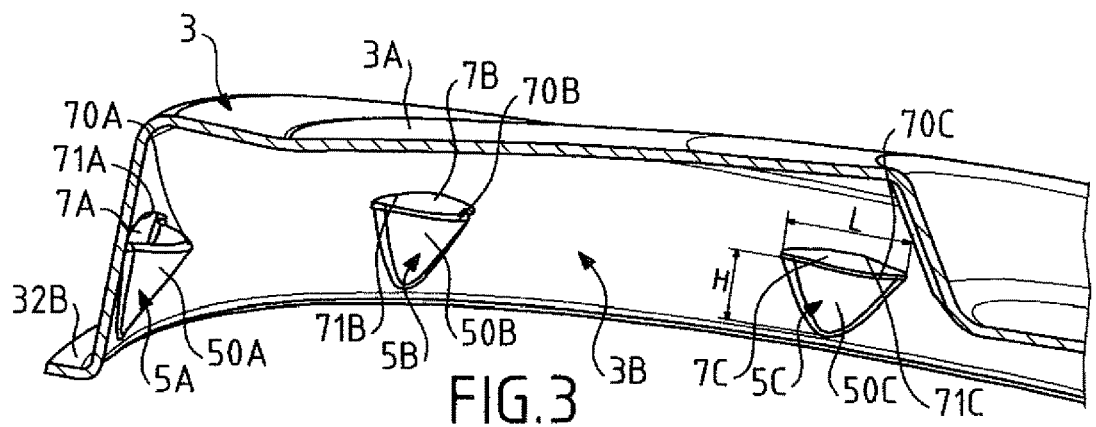
FIG. 3 illustrates, according to a partial sectional view, the lid of the appliance of FIGS. 1 and 2.
Figure 4:
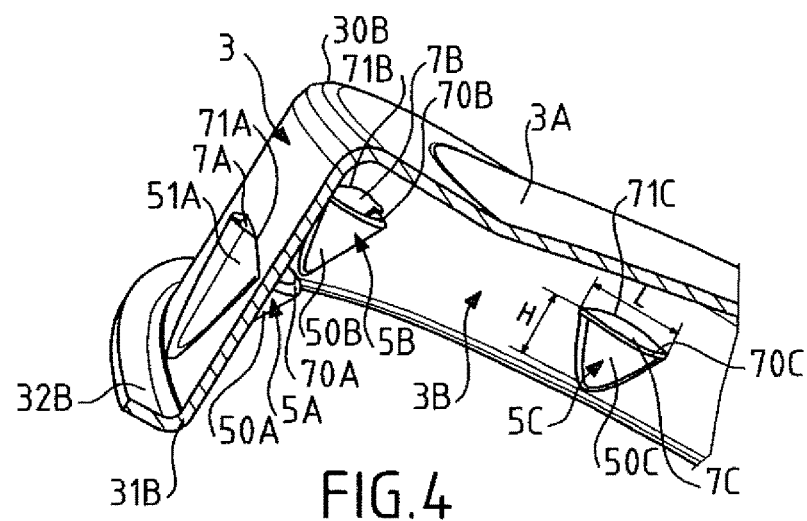
FIG. 4 illustrates, according to another sectional view, the lid of FIG. 3.
Figure 5:
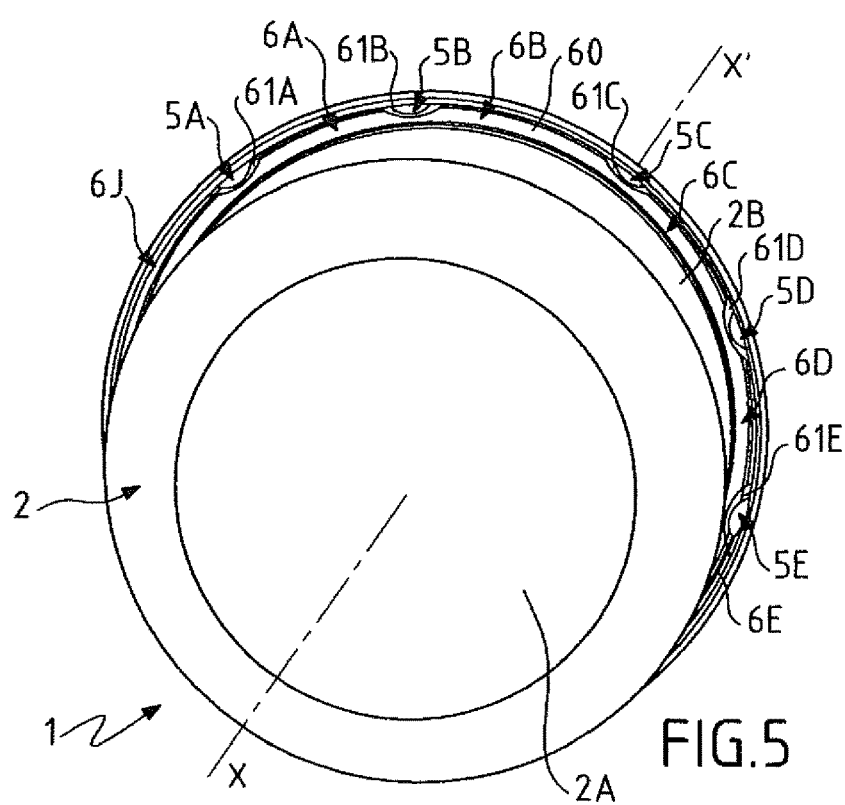
FIG. 5 illustrates, according to a schematic perspective view partially from below, the appliance of FIGS. 1 and 2 with the lid added to the bowl, against the upper free rim of the latter, in a locking wait configuration.

The food pressure cooking appliance 1 may include other operating members (for example, a pressure-sensitive safety finger, an overpressure safety valve, etc.) that are not illustrated in the Figures, these latter showing only "naked" lids for the sake of simplicity and conciseness of the description. FIGS. 1 and 2 show in particular different orifices formed through the lid 3 and intended to place in commutation the inside of the cooking chamber with the different operating members (operating valve, safety valve, safety finger . . . ) intended to be mounted on the lid.

The bowl 2 and the lid 3 hence form respective complementary envelopes, preferably metallic, which, once associated together, form a resulting metal envelope delimiting a closed volume within which the food is intended to be cooked under steam pressure.

The appliance 1 according to the invention also includes means for locking the lid 3 relative to the bowl 2, in order to allow the cooking chamber formed by the association of the lid 3 and of the bowl 2 to reach at least the operating pressure with no risk of seeing the lid 3 escape under the effect of the pressure inside the chamber. By "locking means", it is meant herein means designed to ensure between the bowl 2 and the lid 3 a mechanical link that is robust enough to prevent the separation of the lid 3 from the bowl 2 under the effect of the rising in pressure inside the cooking chamber.

According to the invention, said locking means are bayonet locking means, i.e. locking means making it possible to attach the lid 3 to the bowl 2 by relative rotation of the lid 3 and the bowl 2, preferably according the central axis X-X', to then make the lid 3 switch from a locking wait configuration, in which the lid is added to the bowl 2 and rests freely on the latter, to a locking configuration, in which the bowl 2 and the lid 3 interact with each other to prevent the free separation thereof. The bayonet locking means of the cooking appliance 1 form for that purpose a first series of protrusions 5A-5J and a second series of protrusions 6A-6J that are integral with the envelope of the lid 3 and the envelope of the bowl 2, respectively, and intended to cooperate with each other to ensure the locking of the lid 3 relative to the bowl 2. As well known as such, the protrusions 5A-5J, 6A-6J of each series cooperate two by two, i.e.

each protrusion of one of said series is brought, by rotation of the lid 3 relative to the bowl 2, to pass under a corresponding protrusion of the other series. This mechanical cooperation of the protrusions 5A-5J, 6A-6J of each series hence realizes an interlocking that prevents any untimely separation of the lid 3 from the bowl 2, because, in reaction to an effort of separation of the lid 3 from the bowl 2 exerting along the vertical direction (materialized by the central axis X-X'), the protrusions superimposed two by two come in mutual locking bearing.

In the embodiments illustrated in FIGS. 1 to 19, the protrusions 5A-5J of the first series (integral with the envelope of the lid 3) protrude radially towards the inside of the lid 3, whereas the protrusions 6A-6J of the second series (integral with the envelope of the bowl 2) protrude radially, from the envelope of the bowl 2, towards the outside of the latter. It is however perfectly conceivable, for example according to the alternative embodiment of FIGS. 20 and 21, that the protrusions 5A-5D of the first series protrude towards the outside of the lid 3 (cf. FIG. 20), and that the protrusions 6A-6D of the second series protrude, from said envelope of the bowl 2, towards the centre of the latter. The invention is hence not limited to a particular configuration of the locking ramps, the essential being that the protrusions of the lid 5A-5J and of the bowl 6A-6J, forming lid and bowl ramps, respectively, cooperate with each other by relative rotation of the bowl 2 and the lid 3, herein according to the axis X-X', so that the lid ramps come in position under (or possibly above) the bowl ramps in order to realize between the bowl 2 and the lid 3 a mechanical link able to resist to the internal pressure inside the cooking chamber.

According to the invention, each protrusion of at least one of said series of protrusions is consisted by a volume element, i.e. a three-dimensional element that has an essentially non-planar, curved, for example warped, surface. Such a volume element is hence different from a simple flat tab of the style of those forming the bowl and lid ramps of the prior art. Said volume element has opposite convex 50A-50J and concave 51A-51J faces. In the embodiment illustrated in FIGS. 1 to 19, the protrusions 5A-5J of the first series protrude radially towards the inside of the lid 3, so that the convex face 50A-50J of each volume element is arranged opposite the inside of the appliance 1. Said volume element is formed by a localized radial deformation of the corresponding envelope (of the bowl and/or of the lid). In other words, each volume element is formed by a local three-dimensional deformation of the material constituting the envelope of the bowl 2 and/or of the lid 3.

Each volume element hence forms a protrusion, which is single-piece with the concerned envelope (of the lid and/or of the bowl) and which protrudes from said envelope by defining on one side a convex face 50A-50J and on the other side, in "negative", a concave face 51A-51J corresponding for example to the imprint of application of a forming tool.

The use of such volume elements to form the first and/or the second series of protrusions of the bayonet locking means allows obtaining easily, by simple deformation of material, a protrusion that has excellent mechanical properties, and in particular a resistance to bending far higher than that of the metal tabs implemented in the bayonet locking means of the known pressure cookers. The use of a volume element obtained by localized radial deformation of the envelope of the lid 3 and/or of the bowl 2 indeed allows obtaining a locking protrusion having a section of high quadratic moment relative to the vertical axis of application of the locking efforts exerted by the corresponding protrusion of the other series. Furthermore, any hinge effect, particularly prejudicial to the resistance to bending, is minimized thanks to the three-dimensional nature of the volume element, to the fact that it is single-piece with the envelope from which it comes and that it is connected to said envelope along a connection outline that is not purely rectilinear and that extends in several directions in space. This continuity of material (coming from the fact that the volume element is obtained by a localized radial deformation) and the three-dimensional character of the so-obtained protrusion lead to obtaining an extremely rigid locking ramp and having a high resistance to bending, even when the volume element is very localized and does not extend over a significant length of the perimeter of the envelope (of the lid 3 and/or of the bowl 2) from which it comes. The invention allows in particular obtaining easily locking protrusions 5A-5J having a ratio length L to height H lower than 4, preferably lower than 3, still preferably lower than 2.

Thanks to the invention, it is hence possible to obtain bayonet locking protrusions that do not need to be long, nor manufactured from thick metal sheet, to have sufficient mechanical properties.

This lesser length allows significantly reducing the amplitude of the angular displacement required to make the first and second series of protrusions 5A-5J, 6A-6J cooperate with each other.

Thanks to the reduced size of the volume elements, it is possible to switch from the configuration of pre-locking of the lid 3 relative to the bowl 2 to the configuration of locking of the lid 3 relative to the bowl 2 by relative rotation of the lid 3 and of the bowl 2 according to a rather small angle, for example lower than 30°, and still more preferentially lower than 20°, for example of the order of 15°.

On the embodiments illustrated in FIGS. 1 to 19, said volume elements form the protrusions 5A-5J of the first series integral with the envelope of the lid 3. Each protrusion 5A-5J of the first series of protrusions is hence in this case consisted by a volume element as described hereinabove (i.e. a volume element having opposite convex 50A-50J and concave 51A-51J faces and formed by a localized radial deformation of the envelope of the lid 3), whereas the protrusions of the second series of protrusions are for example (as described in more details in the following) in the form of metal tabs that extend radially from the free upper edge 2C of the bowl 2, herein towards the outside of the bowl 2. More precisely, in the embodiments of FIGS. 1 to 19, the volume elements forming the protrusions 5A-5J of the first series of protrusions are located on the annular belt 3B, and are hence each formed by localized radial deformation of the material forming said annular belt 3B, each so-formed volume element herein protruding radially towards the inside of the lid 3. It is of course perfectly conceivable, according to the alternative embodiment illustrated in FIGS. 20 and 21, that the protrusions 5A-5D integral with the envelope of the lid 3 are formed by volume elements that protrude towards the outside of the lid, and that the protrusions 6A-6D integral with the bowl 2 are them too consisted by volume elements (and not by metal tabs), which protrude towards the inside of the bowl 2. The invention hence relates to all the possible combinations of protrusions, insofar as at least one of the series of protrusions is formed by volume elements as described hereinabove.

Advantageously, and as illustrated in FIGS. 1 to 19, the protrusions 6A-6J of the second series are formed by an annular rim 60 that protrudes towards the outside from the free upper edge 2C, notches 61A-61J for the passage of said volume elements being formed through said annular rim 60, so that the portions of said annular rim 60 extending between each notch 61A-61J form bowl ramps intended to cooperate with the protrusions 5A-5J of the first series integral with the envelope of the lid 3. The annular rim 60 is hence advantageously in the form of a substantially flat crown, which extends substantially horizontally or according to a slight inclination downward, and through which are formed, for example by cutting of the material forming the annular rim 60, the notches 61A-61J that allow the passage of the lid protrusions 5A-5J. The notches have advantageously a rounded profile, conjugated to that of the volume elements. Hence, when the lid 3 covers the bowl 2, the volume elements that protrude from the annular belt 3B may pass through the notches 61A-61J to be positioned lower that the annular rim 60. The lid 3 is then in a pre-locking configuration, from which the locking configuration may be reached by simply rotating the lid 3 relative to the bowl 2 about to the vertical axis X-X', which has for effect to shift angularly the protrusions 5A-5J of the lid 3 and the protrusions 61A-61J of the annular rim 60, hence realizing a locking of the "bayonet" type. Preferably, as seen in particular from FIGS. 1, 7 and 8, the annular rim 60 includes a flange that extends substantially radially and towards the outside from said free upper edge 2C, as well as a skirt 600 that extends substantially downward between an upper edge 600A integral with the flange and a free lower edge 600B against which the protrusions of the first series (herein the volume element forming the ramps of the lid 3) are intended to bear to lock the lid 3 relative to the bowl 2. This embodiment proves to be particularly advantageous on the mechanical point of view, because it allows providing the bowl ramp with a particularly high quadratic moment along the vertical direction X-X', hence leading to obtain a particularly stable and robust mechanical link between the bowl 2 and the lid 3.

Preferably, the skirt 600 is discontinuous, and is not present at the notches 61A-61J, even if it is perfectly conceivable, by way of an alternative, that the skirt 600 extends continuously over the whole perimeter of the annular rim 60, notches 61A-61J includes, without thereby departing from the framework of the invention.

Advantageously, the localized radial deformation of the envelope forming said volume element is itself obtained by embossing of the envelope in question, in order to obtain the volume element by localized plastic deformation of the material forming said envelope. The use of the embossing allows obtaining in a particularly simple, rapid and less expensive manner, a particularly rigid and robust volume element, having in particular excellent properties of resistance to bending in the vertical direction.

Preferably, according to the embodiment of FIGS. 1 to 16, each of said volume elements is formed by a lancing, i.e. the localized radial deformation of the material forming the volume element is accompanied by the presence of an opening formed through the concerned envelope. The opening in question is advantageously adjacent to the corresponding volume element, and may be obtained directly during the embossing, by localized and controlled tear of the material forming the envelope under the effect of the embossing effect, or on the contrary be performed previously or posteriorly to the operation of deformation (for example, by means of a laser cutting beam or any other cutting tool). Each volume element may be formed by a simple lancing, as illustrated, or as an alternative by a double lancing. The use of a lancing proves to be particularly advantageous because it allows obtaining, as will be revealed in more detail by the following description, a particularly rigid and resistant-to-bending volume element that is extremely simple, rapid and cheap to manufacture.

Hence, each volume element of the embodiment of FIGS. 1 to 16 is associated with a respective opening 7A-7J that is formed through the corresponding envelope (i.e., herein, the envelope of the lid 3, and more precisely the annular belt 3B) and is delimited by at least one edge 70A-70J, and preferably by at least two opposite edges (for example, a first longitudinal edge 70A-70J and a second longitudinal edge 71A-71J). The opening is hence a through opening formed through the whole thickness of the concerned envelope. Said localized radial deformation forming said concerned volume element is positioned relative to said respective opening 7A-7J so that at least one portion of said edge 70A-70J (herein the first above-mentioned longitudinal edge, which corresponds to the lower edge of the variants illustrated in FIGS. 1 to 19) is radially deformed to have a curved profile and belongs to said associated volume element. In the embodiments illustrated in FIGS. 1 to 16, said localized radial deformation consists in chasing the lower edge 70A-70J of the opening 7A-7J towards the centre of the lid 3, so as to then transform the edge 70A-70J from an initial profile (before radial deformation) that follows the curvature of the envelope of the lid 3 (i.e. herein the curvature of the annular belt 3B) to a curved profile that is advantageously inscribed in a substantially horizontal plane, i.e. perpendicular to the central axis X-X'. In the examples of FIGS. 1 to 16, said edge 70A-70J of the opening 7A-7J forms the apex of said volume element, and forms still more preferentially a bearing face against which a protrusion of the other series (herein a corresponding bowl ramp) is intended to bear. In other words, said edge 70A-70J of curved profile is intended to come and slide under the ramps of the bowl 2 to ensure the locking of the lid 3 relative to the bowl 2. Preferably, according to the embodiment of FIGS. 1 to 16, only the lower edge 70A-70J of the opening 7A-7J is radially deformed to have a curved profile, the opposite upper edge 71A-71J being itself essentially not deformed and hence remaining inscribed in the continuity of the corresponding envelope (herein the envelope of the lid 3, and more particularly the annular belt 3B). It is however perfectly conceivable, as in the embodiment of FIGS. 17 to 19, that the localized radial deformation intended to form the volume element is made so as to deform radially and similarly both the lower edge 70A and the upper edge 71A of the opening.

Figure 17:
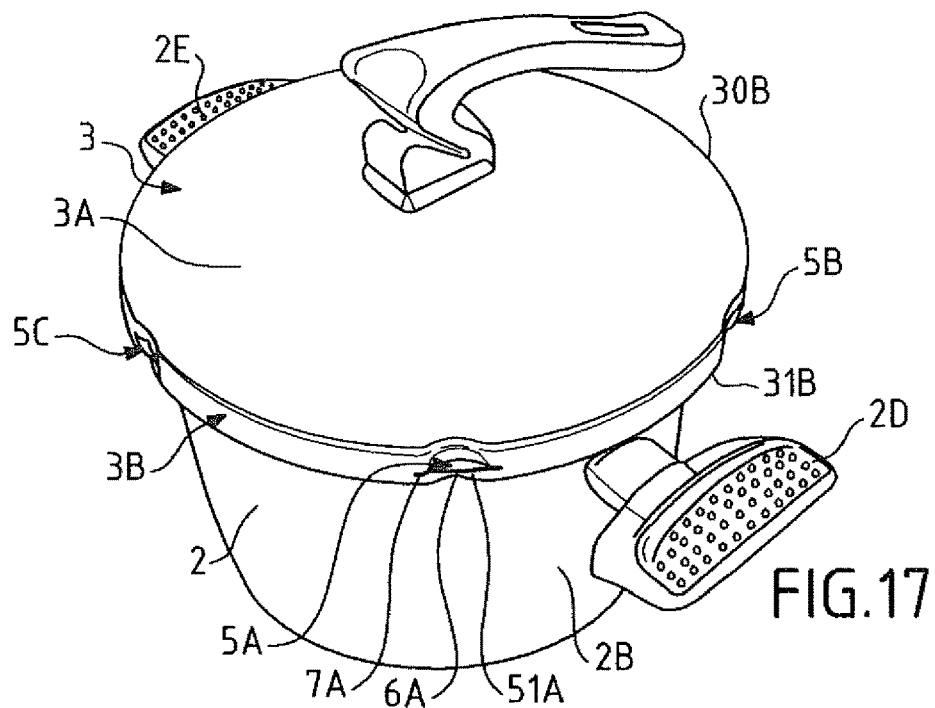
FIG. 17 illustrates, in a general view, an cooking appliance according to a second embodiment of the invention, whose lid is locked to the bowl.
Figure 18:
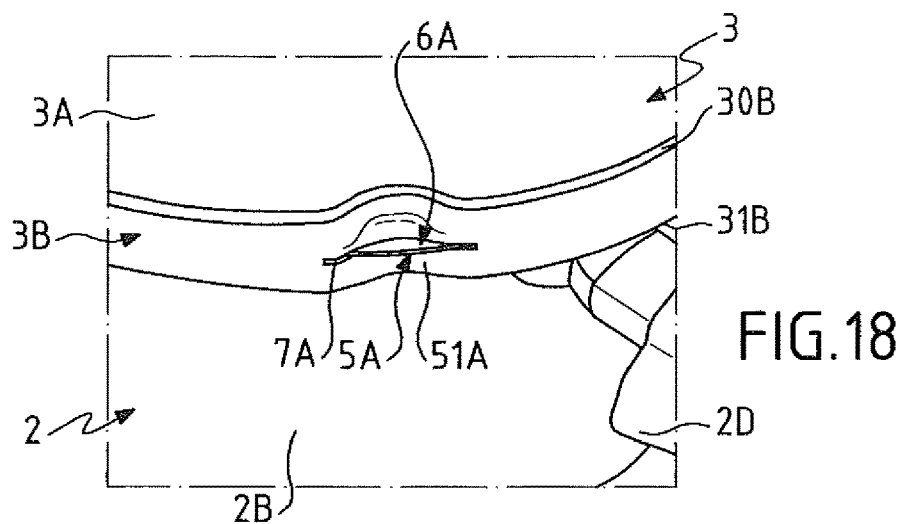
FIG. 18 is an enlarged view of a detail of FIG. 17.
Figure 19:
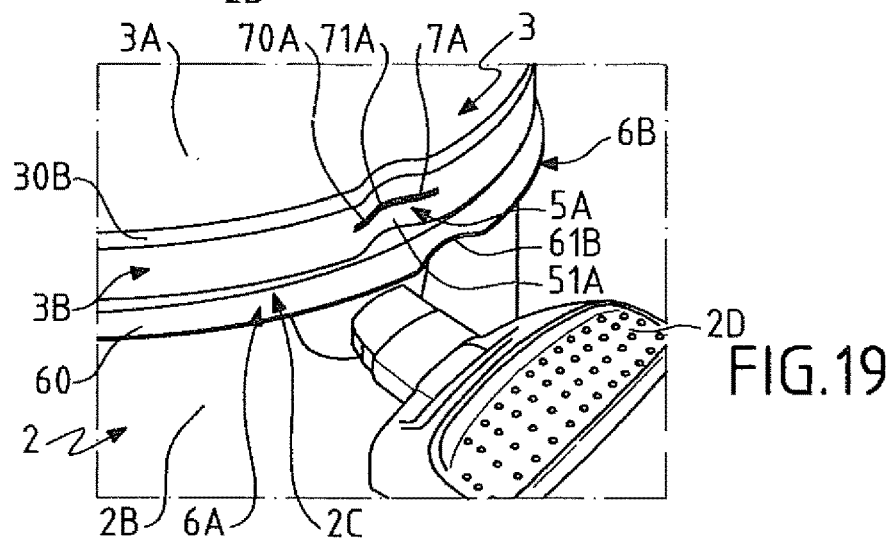
FIG. 19 illustrates the pressure cooker of FIGS. 17 and 18, with the lid unlocked and freely placed on the bowl.

In this embodiment of FIGS. 17 to 19, the protrusions 6A-6J forming the locking ramps of the bowl 2 will hence insert into in the opening, between the lower 70A and upper 71A edges of the latter (cf. FIG. 19), the deformed lower edge 70A bearing against the corresponding protrusion 6A to prevent the separation of the lid 3 from the bowl 2.

The use of a radially deformed edge 70A-70J to form the mechanically active face of the locking protrusions proves to be particularly advantageous, because it allows obtaining extremely rigid and resistant-to-bending protrusions, with a high quadratic moment relative to the vertical direction materialized by the central axis X-X'.

Preferably, the orthogonal projection of each opening 7A-7J to a radial plane is in the form of a substantially rectilinear or bent elongated slot that extends longitudinally in a wholly horizontal direction. Each opening 7A-7J is advantageously, previously to the radial deformation of the edge 70A-70J, in the form of a substantially straight or curved elongated slot, which is substantially inscribed in a mean plane of extension perpendicular to the vertical central axis X-X'. Preferably, each opening 7A-7J is made by localized removing of material, for example by cutting, of the corresponding envelope of the lid 3 and/or of the bowl 2. In the embodiments illustrated in FIGS. 1 to 19 that implement a respective opening 7A-7J associated with each volume element, each opening 7A-7J is hence directly cut in the annular belt 3B. Advantageously, the edge 70A-70J is formed of a central portion 700A (cf. FIGS. 11 to 13) surrounded on either side by two extreme portions 701A, 702A, only said central portion being radially deformed to show a curved profile, so that said extreme portions 701A, 702A do not belong to said volume element. In the examples of FIGS. 11 to 13, the extreme portions 701A, 702A hence follow the curvature of the annular belt 3B, so as to be inscribed in the continuity of the latter, contrary to the central portion 700A which, itself, protrudes, herein towards the centre of the lid 3, of the annular belt 3B, to form a kind of gusset whose free upper edge is intended to bear against the bowl ramps to ensure the locking of the lid 3 relative to the bowl 2. In other words, the radial deformation aiming to form the volume element is not formed over the whole length of the edge 70A-70J, but only over a central portion of the latter (which preferentially forms the essential of said edge 70A-70J), in order to avoid any uncontrolled tear of material towards the ends of the edge 70A-70J under the effect of the deformation effort exerted on the envelope to form the volume element.

As illustrated in the Figures, each volume element is advantageously formed by a shell delimited by a peripheral edge, a first portion of which is located on, and attached to, the corresponding envelope and a second portion of which (formed for example herein by the central portion 700A) is free and forms said bearing face against which a protrusion 6A-6J of the other series is intended to bear. Hence, the first portion of said peripheral edge is inscribed on the surface of the envelope from which comes the concerned volume element, whereas the second portion protrudes from said envelope to form a locking protrusion. Advantageously, the second portion of the peripheral edge of the shell forming the volume element extends substantially in the horizontal plane, perpendicular to the central axis X-X', and preferably extends according to a rounded profile between two ends located on, and attached to, the envelope from which comes the concerned volume element (i.e., in the embodiments illustrated in the Figures, the annular belt 3B of the lid 3). Preferably, said first portion of the peripheral edge of the shell forming the volume element extends at least in part according to a profile flared from the bottom to the top, for example a substantially V-shaped (FIG. 11) or U-shaped (FIGS. 12 and 13) profile. As illustrated in the Figures, said first portion of the peripheral edge of the shell extends longitudinally between two ends that correspond respectively to the two ends between which extend longitudinally the second portion of the peripheral edge, herein formed by the central portion 700A of the edge 70A-70J of the concerned opening 7A-7J. Each volume element hence extends, along the vertical direction materialized by the central axis X-X', between a root and an apex, said apex being formed by said second portion of the peripheral edge of the shell forming the concerned volume element. Advantageously, said first portion is itself formed of at least two segments that converge towards each other from the apex to the root.

Preferably, each volume element is symmetrical with respect to a median radial plane P0-P3. More precisely, in the example of FIG. 11, the first portion of the peripheral edge includes two V-shaped inclined portions, whose lower ends join together and whose upper ends are connected by the radially deformed central portion 700A. In the embodiment of FIG. 12, the first portion of the peripheral edge of the shell has a continuously rounded shape that extends between two free upper ends connected by the radially deformed central portion 700A. Finally, in the embodiment of FIG. 13, the first portion of the peripheral edge of the shell forming the volume element includes two inclined sections connected by a horizontal section, in order to have wholly a "small boat" shape, whose free upper ends are connected to each other by the radially deformed central portion 700A.

The volume elements also serve, in particular when they have a V-gusset shape as illustrated in FIGS. 1 à 16, as a support for the sealing gasket 4, which is hence held by the gussets when the lid 3 is separated from the bowl 2, no additional element for holding the gasket 4 relative to the lid 3 being from then on necessary. The sealing gasket 4, which is advantageously a lip seal, may further be easily dissociated from the lid 3, and still more easily put back in place thanks to the "conical" shape of the gussets forming the volume elements, a shape that allows the gasket 4 to slide up to reaching its final position of bearing against and on the free upper edge 70A-70J of the gussets (cf. FIG. 10).

Of course, the invention is not in any way limited to a particular shape of peripheral edge, even if a shape substantially converging from the top to the bottom, as illustrated in FIGS. 11 to 13, proves to be particularly advantageous by facilitating the self-positioning of the volume elements in the corresponding notches 61A-61J formed through the annular rim 60 of the bowl 2.

Advantageously, as seen in particular in FIG. 8, each volume element has, in projection onto the radial plane P0-P3, a flared profile from the root to the apex.

Hence, each volume element is advantageously in the form of a gusset that converges from the top to the bottom both in the radial plane P0-P3 and in the tangential plane (i.e. the plane of the sheet in FIGS. 11 to 13), which allows facilitating the self-positioning of the gussets in the corresponding notches 61A-61J formed through the annular rim of the bowl 2.

It is moreover conceivable that the bowl and lid ramps are distributed at angular equidistance from each other. However, according to a preferred variant, illustrated in FIGS. 14 to 16, the volume elements (herein formed by embossed gussets), like the corresponding notches 61A-61J formed through the annular rim 60 of the bowl 2, are regularly spaced apart by a first angle $\beta$, except four of them that are spaced from each other two-by-two by a second angle $\alpha$. Such an irregular angular arrangement has the double advantage that:

once the lid 3 locked relative to the bowl 2 (FIG. 15), the second angle $\alpha$, advantageously chosen to be greater than the first angle $\beta$, will create in the metal structure a zone of preferential deformation at which the sealing gasket 4 will be preferentially able to escape (creep) in case of abnormal overpressure, in order to create a vapour leakage and to hence make the interne pressure drop;

the implementation of two different angles $\alpha$ and $\beta$ allows the positioning of the lid 3 only in two relative positions (one of which is illustrated in FIG. 14), symmetrical with respect to the axis X-X'. On the other hand, FIG. 16 shows that, if the gussets 5A-5J of the lid 3 are not placed in the required position relative to the corresponding notches 61A-61J of the bowl 2, then only two of them 5A, 5E will be able to be placed opposite notches of the bowl 2, which prevent any incorrect relative positioning of the bowl 2 and the lid 3.

It is however perfectly conceivable, to favour the force balance, that the angles $\alpha$ and $\beta$ are equal to each other, in which case the gussets 5A-5J are regularly angularly spaced apart, or that all the gussets 5A-5J are regularly angularly spaced apart by a same angle, except two of them, separated by a different angle, so as to allow the positioning of the lid 3 only in a single relative position.

Preferably, in the embodiments of FIGS. 1 to 16, the volume elements are located on the annular belt 3B of the lid 3 remote from the second free circular edge 31B of said belt 3B, so that the annular belt 3B forms, below the volume elements, a skirt of self-centering of the lid 3 relative to the bowl 2.

This self-centering skirt allows the lid 3, in cooperation with the quasi-continuous lateral rim 60 (except notches 61A-61J) of the bowl 2, to be positioned naturally and spontaneously in a relatively centred manner with respect to the bowl 2 when it is applied on the latter.

The invention moreover relates as such to a method of manufacturing a food pressure cooking appliance 1, and in particular of manufacturing an appliance in accordance to the preceding description. Hence, the whole preceding description about the appliance 1 as such remains perfectly valuable and applicable, mutatis mutandis, to the method of manufacturing according to the invention, and vice versa.

The method in question is hence a method of manufacturing of a food pressure cooking appliance 1 including at least:
- a bowl 2 and a lid 3 intended to be locked relative to the bowl 2 to form with the latter a cooking chamber able to rise in pressure,
- bayonet locking means forming first and second series of protrusions 5A-5J, 6A-6J that are integral with the envelope of the lid 3 and the envelope of the bowl 2, respectively, and are intended to cooperate with each other to ensure the locking of the lid 3 relative to the bowl 2.

According to the method of the invention, each protrusion of at least one of said series of protrusions 5A-5J, 6A-6J is consisted by a volume element that has opposite convex 50A-50J and concave 51A-51J faces, said method including a step of forming said volume element by localized radial deformation of the corresponding envelope. Advantageously, said localized radial deformation of the envelope is made by embossing the material constituting the envelope. It is however perfectly conceivable to use any other technique of deformation of the material, as for example the hydroforming technique or the magneforming technique (particularly indicated for making the bowl and the lid illustrated in FIGS. 20 and 21, respectively), without thereby departing from the framework of the invention.

Advantageously, the method comprises a step of making, through said envelope, an opening delimited by at least one edge 70A-70J. Preferably, said opening is made by a operation of laser cutting of the envelope, which allows operating an accurate and rapid cutting, it being understood that other cutting means could possibly be implemented. Advantageously, the step of making the opening is performed before the step of forming said volume element, said step of forming said volume element being implemented so as to radially deform said edge 70A-70J so that is has a curved profile and belongs to said associated volume element.

Hence, in the particularly advantageous embodiment illustrated in FIGS. 1 to 16, the method firstly comprises a step of embossing a discoid metal flank, in order to obtain a cup-shaped lid element with a discoid covering element 3A extended at its periphery by a falling edge forming an annular belt 3B. The so-obtained covering element is then subjected to cutting operations, aiming to form, through the annular belt 3B, narrow slots corresponding to the above-mentioned openings, spaced from each other along the circumference of the belt 3B. Preferably, the slots are slightly curved so that, at the end of the subsequent operation of radial deformation of the annular belt 3B, intended to form the volume element, the radially deformed edge 70A-70J is inscribed in a substantially horizontal plane, and hence forms a substantially horizontal and planar bearing face. Preferably, the cutting step in question is performed by attaching the lid element to a rotational mandrel in order to submit successively different angular sectors of the annular belt 3B of the lid to a cutting laser beam, which makes cut lines forming slots from the outside of the annular belt 3B. Then, once the slots so made, volume elements are formed by chasing the lower edge 70A-70J of each slot towards the inside of the lid 3, for example by embossing the material located at said edge 70A-70J and under the latter, in order to obtain a series of locking "gussets" protruding from the internal face of the annular belt 3B.

According to an alternative example of method of manufacturing according to the invention, it is also possible to make openings (here again for example in the form of curved slots) in a flat metal band, then to make, in this flat metal band, the volume elements by embossing said flat metal band at each opening to deform the lower edge thereof, and hence obtaining a flat metal band from which protrude gussets similar to those described hereinabove, gussets that are single piece with the flat metal band. The method then includes in this case a subsequent step of bending of the metal band provided with gussets, in order to obtain an annular belt provided with gussets protruding from its internal face. Then, the method includes in this case an operation of assembling (for example by welding) the so-obtained belt provided with gussets to a discoid closing element, in order to obtain a complete lid sub-set. According to still another possibility, the discoid belt provided with gussets could be added to the internal face of an annular external belt itself already integral with a discoid closing element.

Concerning moreover the embodiment of FIGS. 17 to 19, the corresponding method of manufacturing is this time characterized in that the step of making the opening may possibly be performed after the step of forming the volume element. For example, to obtain the pressure cooker of FIGS. 17 to 19, a metal lid element is firstly manufactured by embossing of a discoid metal flank in order to obtain a lid element including a discoid lid element 3A that is extended at its periphery by an annular belt 3B. The annular belt 3B in question is then subjected to operations of embossing aiming to deform locally the annular belt, preferably over its whole height, to form radial protrusions directed towards the centre of the lid 3. These radial protrusions are then cut so as to be provided with a horizontal slot intended to allow the passage and the catching of the annular rim 60, as illustrated in the Figures. It is moreover perfectly conceivable, according to an alternative embodiment, to firstly cut the annular skirt then to emboss it to obtain the pressure cooker of FIGS. 17 to 19.

The bowl 2 is itself manufactured for example by embossing a metal flank, which allows obtaining a cylindrical bowl element provided at its free upper edge 2C with a flange that extends radially towards the outside. Said flange is then cut to form notches 61A-61J for the passage of the locking protrusions 5A-5J of the lid 3.

Finally, the invention allows, in particular in the preferential embodiment of FIGS. 1 to 16, easily obtaining, for a reduced price, a bayonet locking system particularly robust and efficient, by optimizing the required quantity of material, thanks to the implementation of reduced thicknesses of material. The invention hence allows, in the embodiment of FIGS. 1 to 16, manufacturing a metal lid 3 from a flank of 1 mm thick, and for example comprised between 0.6 and 1 mm, more preferentially of the order of 0.9 mm. Likewise, the bowl 2, with its annular rim 60, may be manufactured by forming of a metal flank of 1 mm of initial thickness, for example of the order of 0.8 or 0.9 mm, it being understood that the implementation of certain forming techniques (embossing, drawing . . . ) may lead the lateral wall 2B of the bowl 2 to have a thickness lower than the initial thickness of the flank and the lateral rim 60 to have a thickness higher than the initial thickness of the flank. The implementation of other forming techniques (hydroforming, fluoturning . . . ) could lead to different evolutions of thickness.

The pressure cooker according to the invention is hence liable to have a weight significantly lower than that of the bayonet pressure cookers of the prior art.

The invention further allows obtaining bayonet locking means whose components are directly single-piece with the bowl 2 and the lid 3, without requiring the use of added parts such as a stirrup, ears, jaws or segments.

INDUSTRIAL APPLICATION

The invention finds its industrial application in the design, the manufacturing and the use of food cooking appliances.

The invention claimed is:

1. A food pressure cooking appliance comprising:
a bowl and a lid intended to be locked relative to the bowl to form with the latter a cooking chamber adapted to rise in pressure; and
bayonet locking means forming first and second series of protrusions that are integral with an envelope of the lid and an envelope of the bowl, respectively, and that are intended to cooperate with each other to ensure the locking of the lid relative to the bowl;
wherein each protrusion of at least one of said series of protrusions is consisted by a volume element that has opposite convex and concave faces, and that is formed by a localized radial deformation of the corresponding envelope;
wherein each volume element has, in projection onto a radial plane that passes through said volume element, a flared profile from a root to an apex.

2. The appliance according to claim 1, said localized radial deformation is obtained by embossing of the corresponding envelope.

3. The appliance according to claim 1, wherein each volume element is formed by a lancing.

4. The appliance according to claim 1, wherein each volume element is associated with a respective opening formed through the corresponding envelope and delimited by at least one edge, said localized radial deformation being positioned with respect to said opening so that at least one portion of said at least one edge is deformed radially to have a curved profile and belongs to said associated volume element.

5. The appliance according to claim 4 wherein said at least one edge is formed by a central portion surrounded on either side by two extreme portions, only said central portion being radially deformed to show a curved profile, so that said extreme portions do not belong to said volume element.

6. The appliance according to claim 4, wherein said at least one edge forms an apex of said volume element.

7. The appliance according to claim 4, wherein said at least one edge forms a bearing face against which a protrusion of the other series of protrusions is intended to bear.

8. The appliance according to claim 1, wherein each volume element is formed by a shell delimited by a peripheral edge, a first portion of which is located on, and attached to, the corresponding envelope and a second portion of which is free and forms a bearing face against which a protrusion of the other series of protrusions is intended to bear.

9. The appliance according to claim 8, wherein said first portion extends at least in part according to a profile flared from a bottom to a top.

10. The appliance according to claim 8 wherein said second portion extends substantially in a horizontal plane.

11. The appliance according to claim 8, wherein said second portion extends according to a rounded profile between two ends located on, and attached to, the corresponding envelope.

12. The appliance according to claim 11, wherein the first portion extends longitudinally between the two ends.

13. The appliance according to claim 8, wherein each volume element extends, along the vertical direction, between the root and the apex, said apex being formed by said second portion.

14. The appliance according to claim 13, wherein said first portion is itself formed of at least two segments that converge towards each other from the apex to the root.

15. The appliance according to claim 1, wherein each volume element is symmetrical with respect to a median radial plane.

16. The appliance according to claim 1, wherein said volume elements form the protrusions of the first series integral with the lid.

17. The appliance according to claim 16, wherein the envelope of the lid includes a discoid cover element as well as an annular belt that rises between a first circular edge integral with the discoid cover element and a second free circular edge, said volume elements being located on said belt, remote from said second free circular edge.

18. The appliance according to claim 16 wherein said protrusions of the first series protrude radially towards the inside of the lid, so that the convex face is arranged towards the inside of the appliance.

19. The appliance according to claim 16, wherein the bowl comprises a bottom as well as an annular lateral wall that rises between said bottom and a free upper edge delimiting an opening of access inside the bowl, the protrusions of the second series being formed by an annular rim that protrudes towards the outside from said free upper edge, notches for the passage of said volume elements being formed through said annular rim.

20. The appliance according to claim 19, wherein said annular rim includes a flange that extends substantially radially and towards the outside from said free upper edge, as well as a skirt that extends substantially downward between an upper edge integral with the flange and a free lower edge against which the protrusions of the first series are intended to bear to lock the lid relative to the bowl.

21. A food pressure cooking appliance comprising:
a bowl and a lid intended to be locked relative to the bowl to form with the latter a cooking chamber adapted to rise in pressure; and
bayonet locking means forming first and second series of protrusions that are integral with an envelope of the lid and an envelope of the bowl, respectively, and that are intended to cooperate with each other to ensure the locking of the lid relative to the bowl;

wherein each protrusion of at least one of said series of protrusions is consisted by a volume element that has opposite convex and concave faces, and that is formed by a localized radial deformation of the corresponding envelope;

wherein each volume element is associated with a respective opening formed through the corresponding envelope and delimited by at least one edge, said localized radial deformation being positioned with respect to said opening so that at least one portion of said at least one edge is deformed radially to have a curved profile and belongs to said associated volume element;

wherein said at least one edge is formed by a central portion surrounded on either side by two extreme portions, only said central portion being radially deformed to show a curved profile so that said extreme portions do not belong to said volume element.

22. A food pressure cooking appliance comprising:

a bowl and a lid intended to be locked relative to the bowl to form with the latter a cooking chamber adapted to rise in pressure; and bayonet locking means forming first and second series of protrusions that are integral with an envelope of the lid and an envelope of the bowl, respectively, and that are intended to cooperate with each other to ensure the locking of the lid relative to the bowl;

wherein each protrusion of at least one of said series of protrusions is consisted by a volume element that has opposite convex and concave faces, and that is formed by a localized radial deformation of the corresponding envelope;

wherein each volume element is associated with a respective opening formed through the corresponding envelope and delimited by at least one edge, said localized radial deformation being positioned with respect to said opening so that at least one portion of said at least one edge is deformed radially to have a curved profile and belongs to said associated volume element;

wherein said at least one edge forms an apex of said volume element.

23. A food pressure cooking appliance comprising:

a bowl and a lid intended to be locked relative to the bowl to form with the latter a cooking chamber adapted to rise in pressure; and bayonet locking means forming first and second series of protrusions that are integral with an envelope of the lid and an envelope of the bowl, respectively, and that are intended to cooperate with each other to ensure the locking of the lid relative to the bowl;

wherein each protrusion of at least one of said series is consisted by a volume element that has opposite convex and concave faces, and that is formed by a localized radial deformation of the corresponding envelope;

wherein said volume elements form the protrusions of the first series integral with the lid;

wherein the bowl comprises a bottom as well as an annular lateral wall that rises between said bottom and a free upper edge delimiting an opening of access inside the bowl, the protrusions of the second series being formed by an annular rim that protrudes towards the outside from said free upper edge, notches for the passage of said volume elements being formed through said annular rim.

24. A method of manufacturing a food pressure cooking appliance comprising:

providing a bowl and a lid intended to be locked relative to the bowl to form with the latter a cooking chamber adapted to rise in pressure; and providing bayonet locking means by forming first and second series of protrusions that are integral with the envelope of the lid and the envelope of the bowl, respectively, and that are intended to cooperate with each other to ensure the locking of the lid relative to the bowl;

wherein each protrusion of at least one of said series of protrusions is consisted by a volume element that has opposite convex and concave faces, said method including a step of forming said volume element by localized radial deformation of the corresponding envelope;

wherein each volume element has, in projection onto a radial plane that passes through said volume element, a flared profile from a root to an apex.

25. The method according to claim 24, wherein said localized radial deformation of the envelope is made by embossing the material constituting the envelope.

26. The method according to claim 24, further comprising the step of: making, through said envelope, an opening delimited by at least one edge.

27. The method according to claim 26, wherein said step of making the opening is performed before the step of forming said volume element, said step of forming said volume element being implemented so as to radially deform said at least one edge so that is has a curved profile and belongs to said associated volume element.

28. The method according to claim 27, wherein said step of making the opening is performed after the step of forming said volume element, said step of making the opening being implemented so that said at least one edge belongs to said associated volume element and has hence a curved profile.

29. The method according to claim 26, wherein said opening is made by an operation of laser cutting of the envelope.

* * * * *